United States Patent
Ten-Jet-Foei

(10) Patent No.: US 10,960,740 B2
(45) Date of Patent: Mar. 30, 2021

(54) OPEN ROOF CONSTRUCTION FOR A VEHICLE AND ROLLO ASSEMBLY FOR USE THEREIN

(71) Applicant: Inalfa Roof Systems Group B.V., Venray-Oostrum (NL)

(72) Inventor: Suyanto Teri Wahiyu Ten-Jet-Foei, Nijmegen (NL)

(73) Assignee: INALFA ROOF SYSTEMS GROUP B. V., Oostrum (NL)

( * ) Notice: Subject to any disclaimer, the term of this patent is extended or adjusted under 35 U.S.C. 154(b) by 0 days.

(21) Appl. No.: 16/304,566

(22) PCT Filed: May 31, 2016

(86) PCT No.: PCT/EP2016/062270
§ 371 (c)(1),
(2) Date: Nov. 26, 2018

(87) PCT Pub. No.: WO2017/207028
PCT Pub. Date: Dec. 7, 2017

(65) Prior Publication Data
US 2019/0291546 A1     Sep. 26, 2019

(51) Int. Cl.
*B60J 3/02* (2006.01)
*B60J 7/00* (2006.01)
(Continued)

(52) U.S. Cl.
CPC ........... *B60J 7/0015* (2013.01); *B60J 1/2044* (2013.01); *B60J 1/2052* (2013.01); *B60J 3/0286* (2013.01); *B60J 7/043* (2013.01); *E06B 9/56* (2013.01)

(58) Field of Classification Search
CPC ...... B60J 7/0015; B60J 1/2044; B60J 1/2052; E06B 9/58; E06B 9/581
(Continued)

(56) References Cited

U.S. PATENT DOCUMENTS

| 1,370,500 A | 3/1921 | Jones |
| 1,459,155 A | 6/1923 | Ioor |

(Continued)

FOREIGN PATENT DOCUMENTS

| CN | 2700152 Y | 5/2005 |
| CN | 1721216 A | 1/2006 |

(Continued)

OTHER PUBLICATIONS

International Search Report dated Feb. 27, 2017 for corresponding International Application No. PCT/EP2016/062270, filed May 31, 2016.
(Continued)

*Primary Examiner* — Dennis H Pedder
(74) *Attorney, Agent, or Firm* — Steven M. Koehler; Westman, Champlin & Koehler

(57) ABSTRACT

An open roof construction includes a rollo screen and a winding shaft. The screen includes a screen edge which is attached to a stationary member. An operating beam on an opposite edge is movable parallel to the opening in correspondence with the amount of screen wound on or off the winding shaft. The screen has two longitudinal edges which, when the screen is wound off, are brought into engagement with holding members extending alongside the longitudinal edges of the roof opening. The holding members each comprise at least a groove having an elongated opening. An edge area near each edge of the screen is insertable into the respective groove together with a locking member clamping the screen in the groove. The locking member, the edge area of the screen and the groove having a shape and/or dimension preventing the locking member from unintentionally leaving the groove through the entrance opening.

21 Claims, 12 Drawing Sheets

(51) Int. Cl.
  *B60J 7/043* (2006.01)
  *E06B 9/56* (2006.01)
  *B60J 1/20* (2006.01)

(58) Field of Classification Search
  USPC ...... 296/214; 160/242–246, 250, 269–273.1, 160/274
  See application file for complete search history.

(56) References Cited

U.S. PATENT DOCUMENTS

| | | | |
|---|---|---|---|
| 1,673,326 A | 6/1928 | Goldsmith | |
| 3,017,927 A | 1/1962 | Demko | |
| 4,649,981 A | 3/1987 | Bibeau | |
| 5,117,892 A | 6/1992 | Murray | |
| 5,934,353 A | 8/1999 | Buhr | |
| 6,179,373 B1 | 1/2001 | Bohm et al. | |
| 6,394,173 B2 | 5/2002 | Enssle | |
| 6,942,003 B2 | 9/2005 | Thompson | |
| 7,114,766 B2 | 10/2006 | Becher et al. | |
| 7,114,767 B2 | 10/2006 | Grimm et al. | |
| 7,793,702 B2 | 9/2010 | Biewer et al. | |
| 7,971,626 B2 | 7/2011 | Renz | |
| 8,955,575 B2 | 2/2015 | Glasl et al. | |
| 9,090,147 B2 | 7/2015 | Nellen et al. | |
| 10,173,503 B2 * | 1/2019 | Ten-Jet-Foei | B60J 7/067 |
| 2005/0225122 A1 | 10/2005 | Becher et al. | |
| 2005/0225123 A1 | 10/2005 | Grimm et al. | |
| 2006/0027347 A1 | 2/2006 | Boehm et al. | |
| 2007/0175603 A1 | 8/2007 | Lin | |
| 2008/0179021 A1 | 7/2008 | Biewer et al. | |
| 2009/0145559 A1 | 6/2009 | Glasl et al. | |
| 2010/0170645 A1 | 7/2010 | Lin | |
| 2011/0146921 A1 | 6/2011 | Nellen et al. | |
| 2011/0227371 A1 | 9/2011 | Nellen et al. | |
| 2016/0347156 A1 * | 12/2016 | Ten-Jet-Foei | B60J 1/2025 |

FOREIGN PATENT DOCUMENTS

| | | |
|---|---|---|
| DE | 102004028882 A | 1/2006 |
| DE | 202006015107 U1 | 1/2007 |
| DE | 102013207920 A1 | 10/2014 |
| EP | 1588880 A2 | 10/2005 |
| EP | 1616737 A1 | 1/2006 |
| EP | 1953018 A1 | 8/2008 |
| FR | 1378077 A | 11/1964 |
| WO | 2006053520 A2 | 5/2006 |
| WO | 2010022769 A1 | 3/2010 |

OTHER PUBLICATIONS

Written Opinion of the International Searching Authority dated Feb. 27, 2017 for corresponding International Application No. PCT/EP2016/062270, filed May 31, 2016.

Written Opinion of the International Searching Authority dated Dec. 13, 2018, for corresponding International Application No. PCT/EP2016/062270, filed May 31, 2016.

Communication from the European Patent Office for European Patent Application No. 116726310.2, dated Nov. 11, 2020.

* cited by examiner

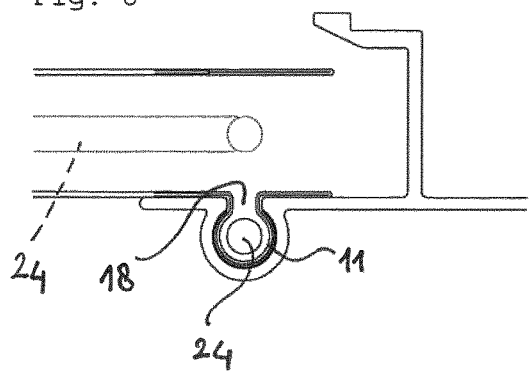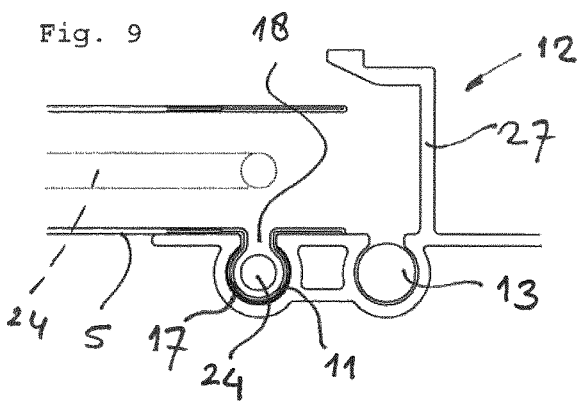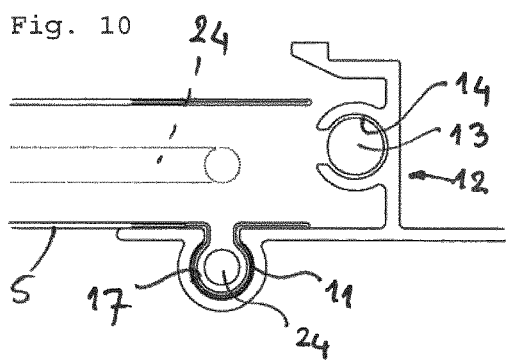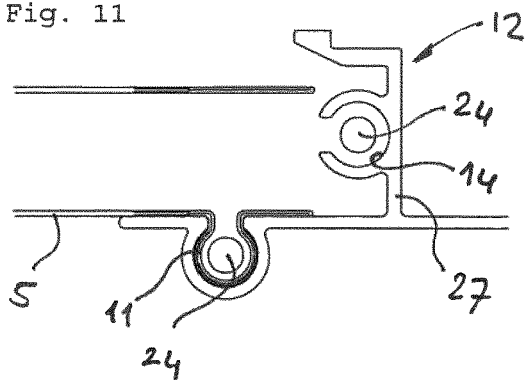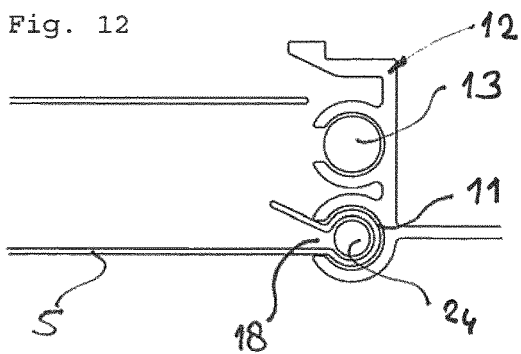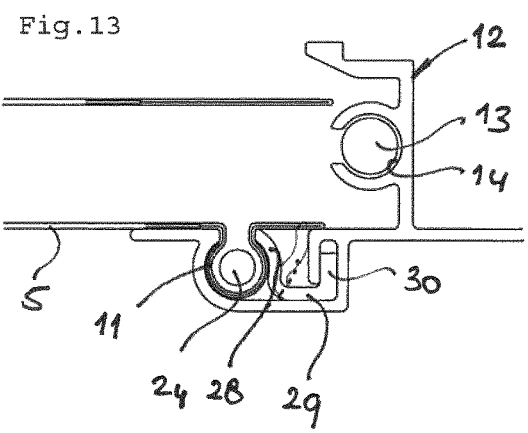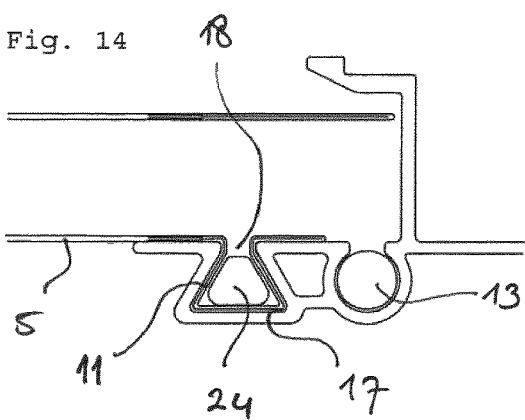

OPEN ROOF CONSTRUCTION FOR A VEHICLE AND ROLLO ASSEMBLY FOR USE THEREIN

CROSS-REFERENCE TO RELATED APPLICATION

The present application is a national stage of and claims priority of International patent application Serial No. PCT/EP2016/062270, filed May 31, 2016, and published in English as WO 2017/207028, the content of which is hereby incorporated by reference in its entirety.

BACKGROUND

The invention relates to an open roof construction for a vehicle. The open roof construction includes a roof opening in a stationary roof part and a rollo assembly positioned below the roof opening intended for covering the roof opening. The rollo assembly comprises a rollo screen and a winding shaft. The rollo screen includes a rollo screen edge which is attached to a stationary member of the open roof construction. The opposite edge is formed by an operating beam which is movable parallel to the roof opening in first and second directions in correspondence with the amount of rollo screen being wound on or off the winding shaft. The rollo screen has two longitudinal edges which, when the rollo screen is wound off, are brought into engagement with holding members extending alongside the longitudinal edges of the roof opening.

In a known open roof construction, a sunscreen includes a visible portion and a non-visible portion above it. The visible portion is stationary with respect to the sides of the roof opening and the non-visible portion can be unwound at one end and reversed into the visible portion on the opposite end. Thus, the visible portion is stationary, but the length of it varies to open and close the rollo screen. Because of such a stationary position of the rollo screen edge of the visible portion, any connections there also have a stationary position to the stationary part of the open roof construction. This has a positive effect on the life span and reliability of these connections, while allowing to simplify the design of these connections.

SUMMARY

The open roof construction includes a roof opening in a stationary roof part and a rollo assembly positioned below the roof opening intended for covering the roof opening. The rollo assembly comprises a rollo screen and a winding shaft. The rollo screen includes a rollo screen edge which is attached to a stationary member of the open roof construction. The opposite edge is formed by an operating beam which is movable parallel to the roof opening in first and second directions in correspondence with the amount of rollo screen being wound on or off the winding shaft. The rollo screen has two longitudinal edges which, when the rollo screen is wound off, are brought into engagement with holding members extending alongside the longitudinal edges of the roof opening. The holding members each comprise at least a holding groove having an elongated entrance opening, an edge area near each longitudinal edge of the rollo screen being insertable into the respective holding groove together with a locking member, preferably an elongated locking member, clamping the rollo screen in the holding groove, the locking member. The edge area of the rollo screen and the holding groove have a shape and/or dimension preventing the locking member from unintentionally leaving the holding groove through the entrance opening.

Due to this, preferably separate, locking member it is possible to hold the edge of the rollo screen in a reliable manner due to it being clamped in the holding groove.

The entrance opening of the holding groove may be more narrow than the holding groove, such that the locking member is locked within the holding groove when the locking member and the edge area of the rollo screen are inserted in the holding groove. This is an easy way to hold the locking member and therefore the edge area of the rollo screen in the holding groove.

In an embodiment, the operating beam is provided with a displacer acting on at least one of the locking member and holding groove to enable the locking member to enter and exit the holding groove together with the edge area of the rollo screen, wherein at least one of the edge area of the rollo screen, the locking member and the holding groove may be resiliently deformable to enable the locking member to enter and exit the holding groove.

The elastic deformation force, which may thus be provided either by the edge area of the rollo screen, the locking member and/or the holding groove, generally together with friction forces is sufficient to hold the edge area of the rollo screen in a reliable manner.

Each longitudinal edge area may extend into the holding groove through the entrance opening, around the locking member and then out of the holding groove again.

To provide a further means to hold the edge area of the rollo screen, a stop member may be provided at or near the longitudinal edges of the rollo screen and may be adapted to cooperate with the locking member to ensure the rollo screen remains locked in the holding groove.

In one embodiment the elongated locking member is stationary in longitudinal direction with respect to the holding groove, wherein the operating beam is adapted to accommodate the locking member when it exits the holding groove in case the operating beam is moved to wind the rollo screen on the winding shaft.

Thus, when the elongated locking member is out of use, it can be accommodated in the operating beam such that it is not visible and still under control.

In another embodiment in which the elongated locking member is stationary in longitudinal direction with respect to the holding groove, the stationary part is provided with an accommodating groove parallel to the holding groove to accommodate the locking member when it exits the holding groove in case the operating beam is moved to wind the rollo screen on the winding shaft.

In still another embodiment in which the elongated locking member is stationary in longitudinal direction with respect to the holding groove, either the operating beam or the stationary part is provided with a winding pulley to accommodate the locking member when it exits the holding groove in case the operating beam is moved to wind the rollo screen on the winding shaft.

In said embodiment in which the locking member is stationary in longitudinal direction with respect to the holding groove, but is movably attached to the stationary part next to the respective holding groove so as to be movable between a position within the holding groove and a position next to the holding groove, the operating beam or a part moving with it being provided with a displacer acting on the locking member to move it between both positions when the operating beam is moved to wind or unwind the rollo screen.

The operating beam may be provided with a member to hold the respective longitudinal edge of the rollo screen when the edge area is pushed into the holding groove. Such member ensures that the rollo screen is stretched from the inside when it is urged into the holding groove.

The holding member of the operating beam may be a cam clamping the rollo screen positioned laterally outside the holding groove, which is a very simple means.

The longitudinal edges of the rollo screen may also each be provided with a stop member to keep the respective longitudinal edge of the rollo screen substantially stationary in lateral direction when the edge area is pushed into the holding groove. This stop member may at least be one of a strip, cable and/or edge reinforcement.

In another embodiment, the stop member is positioned substantially within the edge area and includes two spaced strips such that they are positioned in the holding groove with the locking member between them.

Said locking member may be an elongated element which may be constructed as a solid steel or a twisted steel cable or wire, or a rod made of rubber-like material or plastic, such as nylon or PMMA. This depends for example whether it must be elastically deformable or not.

The locking member may for example be of circular or trapezium-shaped cross section.

If the entrance opening of the holding groove is on the upper side thereof, and thus the rollo screen will be stretched at substantially 90 degrees, it is easier to hold the edge area of the rollo screen into the holding groove, than if the entrance opening is at the lateral side thereof.

If it is the holding groove that is elastically deformable, the holding groove may be at least partly defined by a flexible free standing groove wall which is configured to bend when the locking member is entering or exiting the holding groove.

The invention further relates to a rollo assembly intended for use in an open roof construction.

BRIEF DESCRIPTION OF THE DRAWINGS

Hereinafter the invention will be elucidated while referring to the drawings, in which:

FIGS. 8-15 are views corresponding to that of FIG. 7d, but showing different embodiments.

FIGS. 21, 22 are views corresponding to that of FIG. 2, but shown from a different angle, while FIG. 21 shows a slightly changed embodiment.

DETAILED DESCRIPTION

Figure 1:
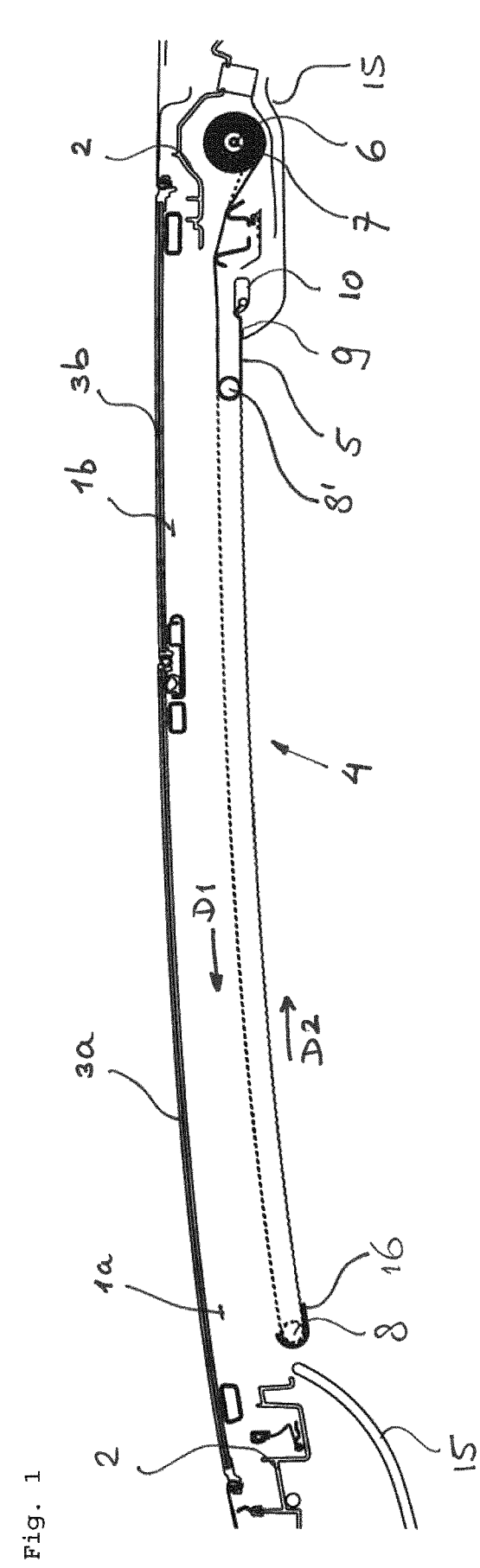
FIG. 1 is a longitudinal sectional view of an open roof construction.
Figure 2A:
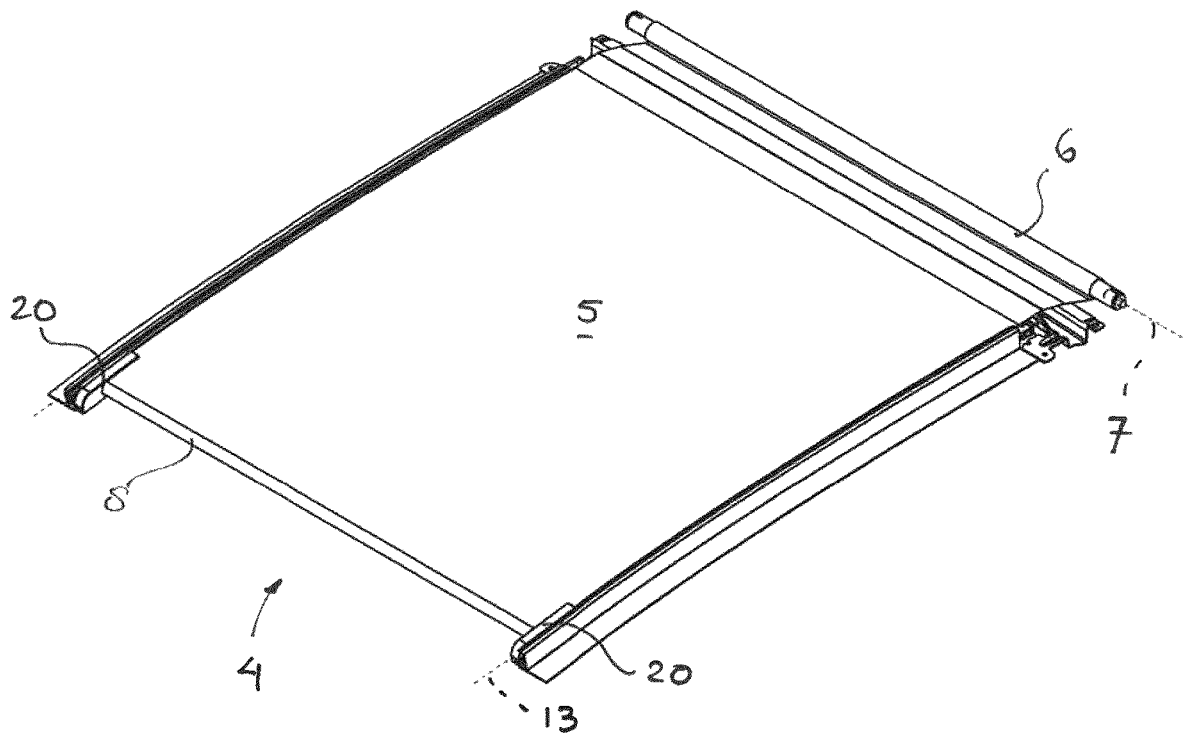
FIGS. 2a and 2b are perspective views of the rollo assembly of the open roof construction of FIG. 1 in a closed and open position, respectively.
Figure 2B:
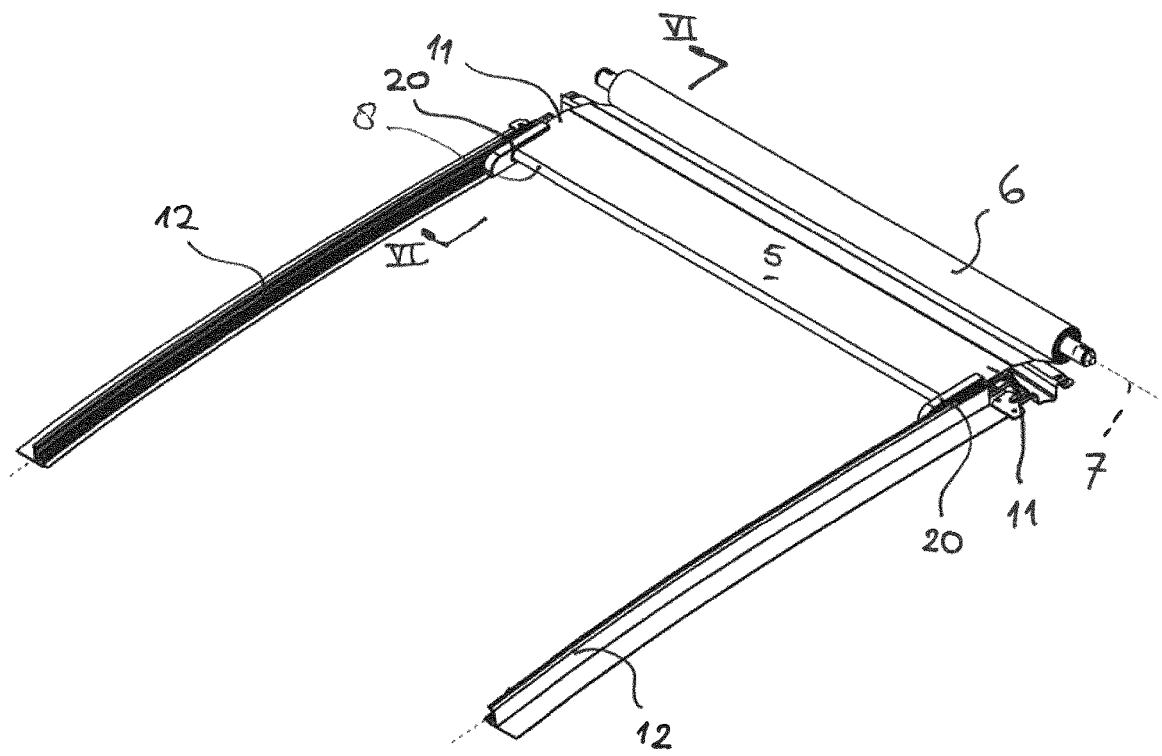

Referring firstly to FIGS. 1 and 2, an open roof construction for a vehicle is illustrated. It comprises a roof opening 1 in a stationary roof part 2 which can be closed by a movable roof closure. Here, there is in fact a front roof opening 1a and a rear roof opening 1b, closable by a rigid transparent front panel 3a and a rigid transparent rear panel 3b. As is known in the respective field, such roof panel or panels 3 may be operated (by means not illustrated but generally known) for opening and closing the roof opening 1. One of the panels 3, normally the rear panel 3b, may also be fixed.

A rollo assembly 4, here acting as a sunscreen assembly, is positioned below said roof opening 1 (although it is noted that parts of such a rollo assembly 4 also may be located below the stationary roof part 2). The rollo assembly 4 comprises a rollo screen 5 and a winding shaft 6 for the rollo screen 5 which is rotatable around a (horizontal transverse) stationary axis of rotation 7. The rollo screen 5, starting from the winding shaft 6, firstly extends substantially in a first direction D1, next around a reversal member 8 and finally back in an opposite second direction D2 and ends at a rollo screen edge 9 which is attached to a stationary member 10 of the open roof construction.

The reversal member 8 is movable in parallel to said first and second directions D1, D2 in correspondence with the amount of rollo screen 5 being wound on or off said winding shaft 6. For achieving the required translational movement of the reversal member 8 it has two opposite ends and the rollo screen 5 has two longitudinal edge areas 11 (FIG. 2) guided in two opposite guides 12 extending in parallel to said first and second directions D1, D2 (generally, but not exclusively, the lengthwise direction of the vehicle) at opposite side edges of the roof opening 1. Two drive cables 13 (FIG. 3), which are part of a drive mechanism, are provided engaging said opposite ends of the reversal member 8. The drive cables 13 run in cable channels 14 provided in the guides 12. The position of the reversal member 8 and thus of the rollo screen 5 is controlled by the drive cables 13. In FIG. 1 the reversal member 8 (and thus the rollo screen 5) has been illustrated in two different positions: in solid lines a position 8' in which the rollo screen 5 is in a position substantially fully opening the roof opening 1 (see also FIG. 2b) and at least partially hidden by a headlining 15 and with dashed lines a fully closed position 8 (see also FIG. 2a). Thus, the lower, visible portion of the rollo screen 5 is stationary, only the length thereof varies due to the movement of the reversal member 8.

It is possible that the winding shaft 6 is provided with a spring member (such as an internal coiled spring) biasing the winding shaft 6 in a direction for winding the rollo screen 5. As a result the rollo screen is always kept taut, irrespective the position of the reversal member 8.

The reversal member 8 may comprises a rotatable cylindrical member which will rotate in accordance with the rollo screen 5 moving around it when the reversal member 8 is displaced. In the illustrated embodiment shown here, the reversal member is a non-rotating member providing or defining a low friction surface intended for engaging and guiding the rollo screen 5.

The reversal member 8 further may be provided with a cover member 16 which hides the part of the rollo screen 5 extending around the reversal member 8 from view.

The guides 12 are used for supporting the rollo screen 5 and keeping it in a desired position. FIGS. 3-7 show the cooperation between one of the guides 12 and the sunscreen 5 in one embodiment. The guide 12 comprises next to and inward of the cable guide channel 14 a holding groove 17 having a part-circular cross-section and a narrow upper entrance opening 18. The entrance opening 18 is directed substantially vertically, but could also be directed horizontally towards the opposed holding groove 17 of the other guide 12. The reversal member 8 and the cover member 16 (not shown here) form the operating beam for the sunscreen 5. At each end of the operating beam, there is provided a slider 20 to which the drive cable 13 is attached. The slider 20 is guided by one or more guide grooves 21 in the guide 12. Rollo screen displacer 22 is attached to the slider 20. In this embodiment, it comprises a disk-shaped element 23. This element 23 is used to hold edge area 11 of rollo screen 5 in transverse direction so that when a part of the edge area 11 of the rollo screen 5 is inserted into the holding groove 17 rollo screen 5 is stretched from the inside instead of the edge of rollo screen 5 being pulled inwardly.

In order to keep the edge area 11 in the holding groove 17, there is provided a locking element 24, which in this case is an elongated cable, rope, wire or cord-like element having a length larger than the length of the holding groove 17. The cross-section of the locking element 24 is of the same shape as that of the holding groove 17 and is such that it fits easily into the holding groove 17 when it is lined with the edge area 11 of the rollo screen 5, but only fits through the entrance opening 18 of the holding groove if either the edge area 11, the entrance opening 18 or the locking element 24 itself is elastically deformed, i.e. bent or compressed. This prevents the locking element from leaving the holding groove 17 unintentionally and also causes the locking element 24 to clamp the edge area 11 of the rollo screen 5 to the wall of the holding groove when pulling forces are exerted on the rollo screen. Thus, if the rollo screen 5 is stretched when the edge area 11 is urged into the holding groove 17, this stretching force will help the locking element to clamp and thus hold the edge area 11 in the holding groove 17. Means may be provided to ensure that the rollo screen is stretched, which will be shown and discussed later on.

The material of locking element 24 may be chosen taking several variables in consideration: friction with various contacted parts like edge area 11, buckle resistance, flexibility, compressibility etc. Possible configurations are: solid steel cable, twisted steel cable or wire, nylon, rubber-like or PMMA cable. A 2 mm PMMA cable appears useful. To achieve compressibility, not only the material is decisive, also the construction of the cable, such as a hard core with a compressible cladding, a compressible core with a hard but flexible cladding, a hollow core with a flexible cladding etc.

Locking element displacing means are provided in the form of a nose-shaped inserting element 25 (rotatable or not) to force the locking element 24 through the entrance opening 18 into the holding groove 17 and a wedge or finger-shaped removing element 26 lifting and forcing the locking element 24 out of the holding groove 17 again. The forces exerted by these elements on locking element 24 is much larger and directed differently compared to the stretching force exerted by the rollo screen 5. The finger-shaped removing element 26 is mounted closer to the rollo screen displacer 22 than the nose-shaped inserting element 25. The removing element 26 for locking element 24 also acts as rollo screen displacer 22 for edge area 11 of rollo screen 5 as it holds edge area down just before locking element 24 is inserted into holding groove 17. If disk-shaped element 23 is not present (see FIG. 21) finger-shaped element 26 acts as an inserting element for edge area 11 of rollo screen 25.

FIGS. 7a-7d show how the edge area 11 of the rollo screen 5 and the locking element 24 are forced by the elements 23, 25 and 26 into holding groove 17 when operating beam 8 is moved to close rollo screen 5.

Figure 7A:
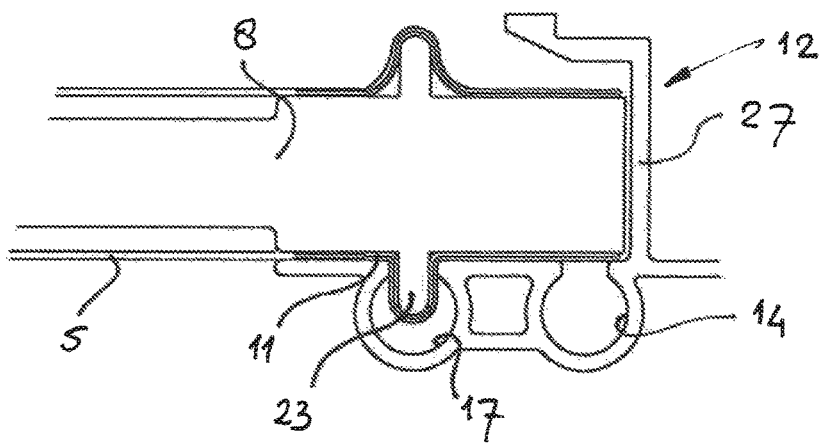
FIGS. 7a-7d are cross sectional views along the line VIIa-VIId, respectively, in FIG. 6.
Figure 7B:
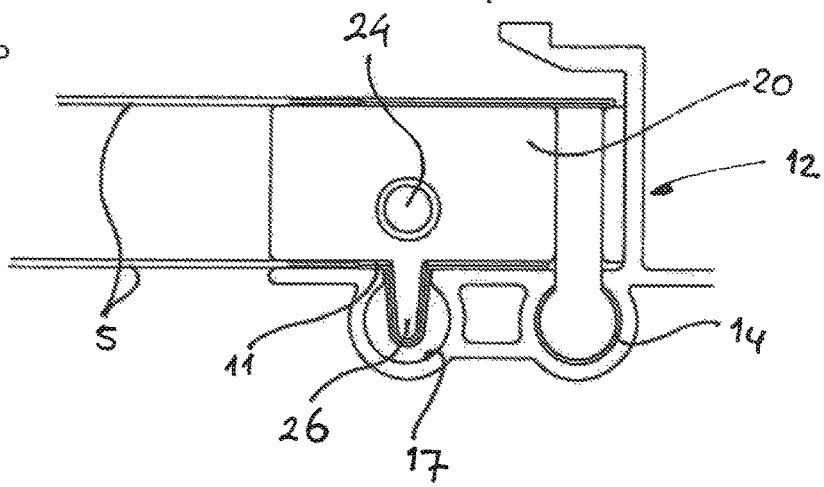
Figure 7C:
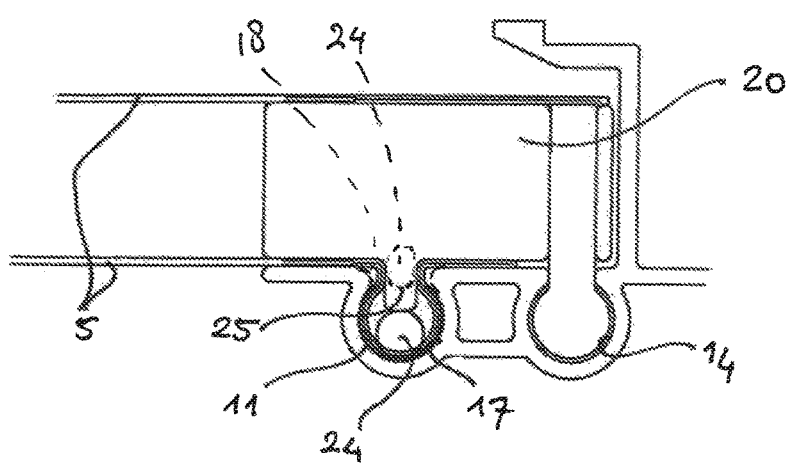

In FIG. 7b, the knife-shaped removing element 26 keeps the edge area 11 down in the holding groove 17, before the locking element 24 is inserted into the holding groove 17 by the nose-shaped element 25, as shown in FIG. 7c. Either the locking element 24 is compressed during its entrance of the holding groove 17 through the entrance 18, or the entrance 18 is deformed by the locking element 24 to widen it allowing the locking element to pass. This is both illustrated by dashed lines in FIG. 7c.

Figure 7D:
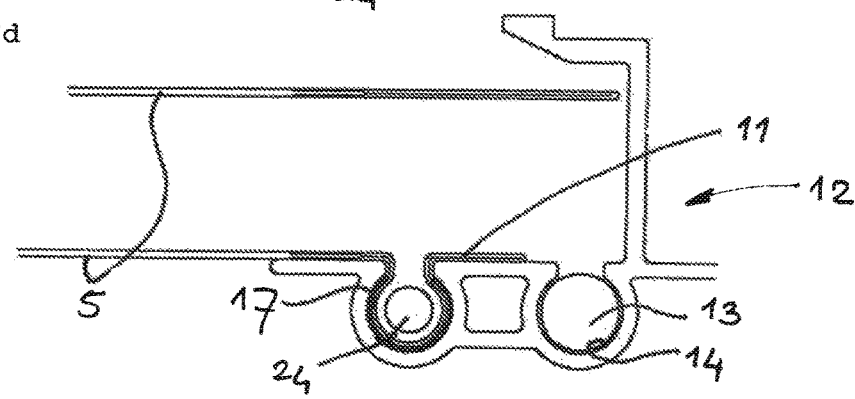

The situation as shown in FIG. 7d is not exactly as in reality as the pulling forces from the left as exerted by the rollo screen 5 will push the locking element 24 upwardly against the wall of holding groove 17 next to entrance opening, where locking element 24 will clamp and hold the edge area 11 within holding groove 17.

Figure 3:
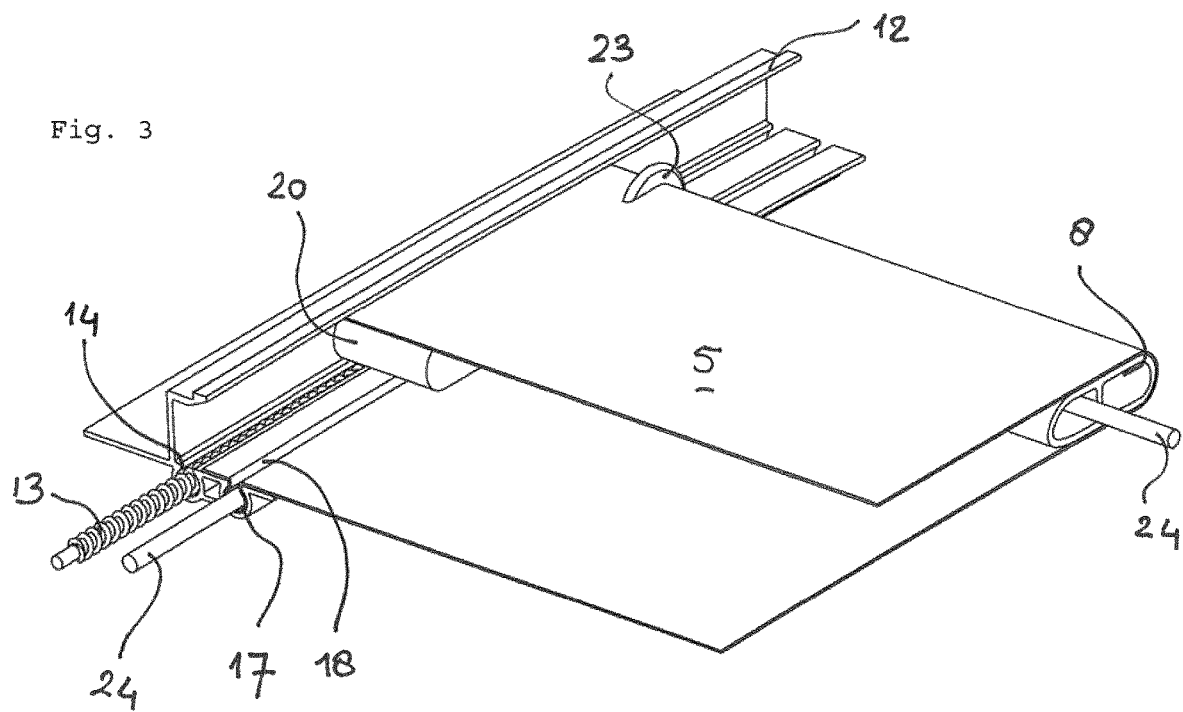
FIG. 3 is a perspective view from the rear, showing a part of the rollo screen near an end of the operating beam and an end of the stationary guide.
Figure 4:
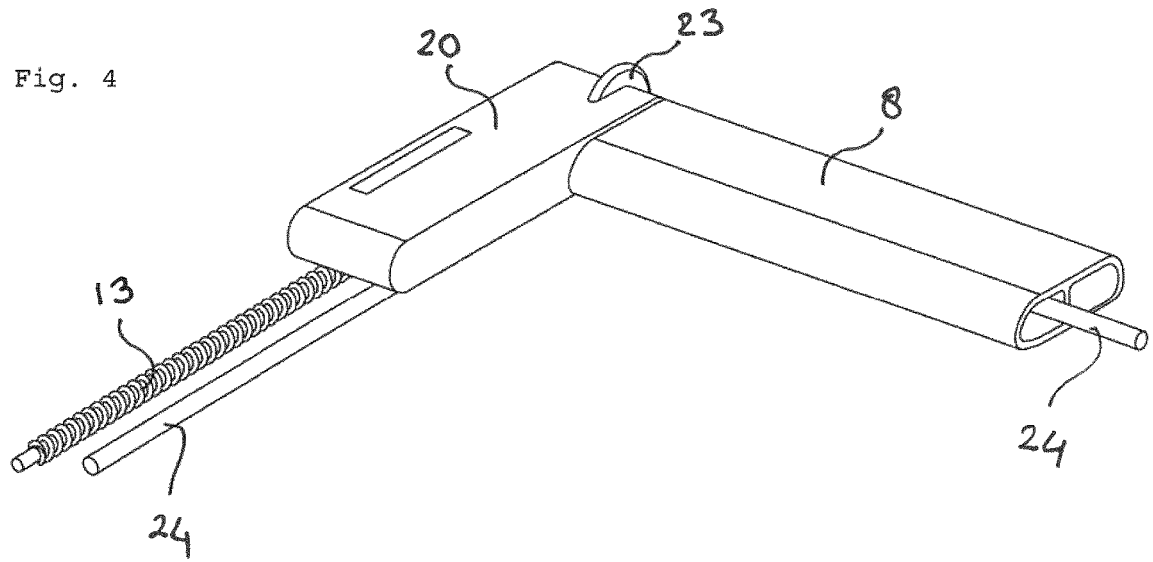
FIG. 4 is a view similar to that of FIG. 3, but without the rollo screen and guide.
Figure 5:
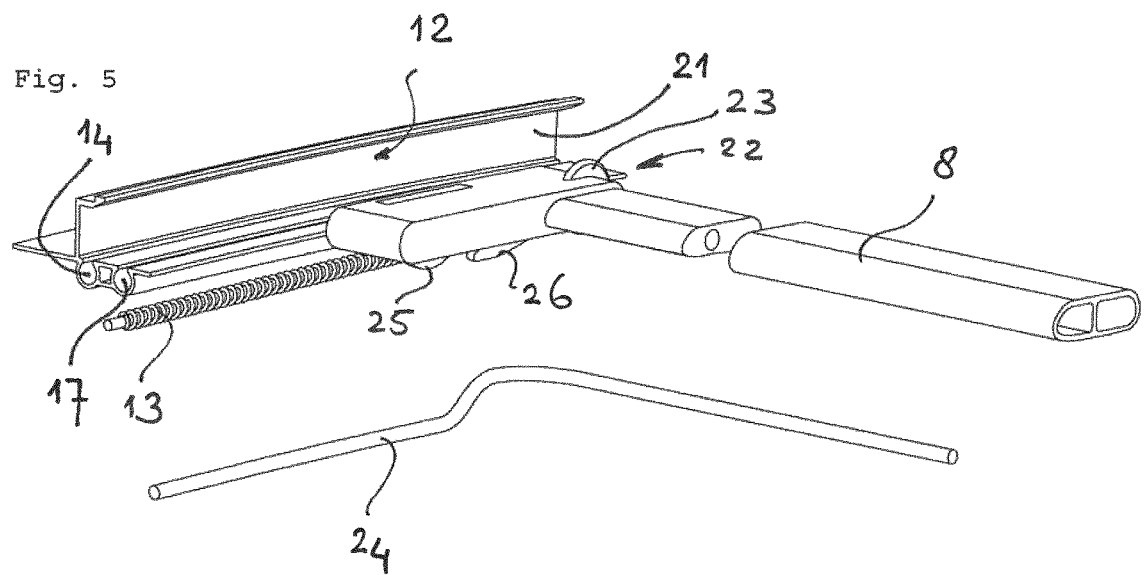
FIG. 5 is a view substantially similar to that of FIG. 3, but without the rollo screen and with the cable and locking member shown separately

In the embodiment of FIGS. 3-7, the excess length of locking element 24 which is outside holding groove 17 is taken up by the operating beam 8, which is for example shown in FIGS. 3 and 4. FIG. 5 shows the curvature of locking element 24 at the transition from holding groove 17 to operating beam 18. Further details will be provided further down. In these embodiments, locking element 24 is stationary in longitudinal direction of guide 12, so that it does not move in longitudinal direction with respect to the edge area 11 of rollo screen 5 when the rollo screen is deployed.

FIGS. 8-15 show various configurations for holding groove 17 and locking element 24.

The embodiment of FIG. 8 is similar to that of FIGS. 3-7, except that the rollo is operated manually by moving the rollo through the cover member 16 of reversal member 8, which will be provided with a hand grip or the like. A drive cable 13 and cable channel 14 in guide 12 is not required then.

FIG. 9 shows again the configuration as in FIGS. 3-7.

In the FIG. 10 embodiment, there is again a drive cable 13 and cable channel 14, but this cable channel 14 is positioned higher than holding groove 17, in this case at an upright flange 27 of guide 12. The opening of cable channel 14 is now directed horizontally toward to opposite cable channel 14.

FIG. 11 illustrates that cable channel 14 can be used as an accommodating groove to accommodate locking element 24 when it is removed from holding groove 17. So, instead of being guided into reversal member 8 it is guided towards and into cable channel 14 which is empty on the side of the slider 20 away from rollo screen 5. Slider 20 will have a guide element, such as a guide channel to guide 24 locking element between cable channel 14 and holding groove 17.

In the embodiment of FIG. 12, holding groove 17 is again positioned next to cable channel 14, but now with a substantially horizontally directed entrance opening 18 and below cable channel 14. Edge area 11 of rollo screen 5 is provided with an additional, more rigid stop member 28 preventing edge area 11 of rollo screen 5 from slipping beyond locking member 24 and out of holding groove 17.

The FIG. 13 embodiment is comparable to that of FIG. 11, but in this case holding groove 17, or at least its entrance opening 18, is made such that it can be deformed elastically to allow locking member 24 to enter and leave holding groove 17 while edge area 11 is within holding groove 18. As mentioned before, at least one of locking member 24, edge area 11 and entrance opening 18 must be elastically deformable. The cross sectional size of locking member 24 is such that it could enter and leave entrance opening 18 without edge area 11 extending into and out of holding groove 17. If edge area 11 is within holding groove 17 twice the thickness of edge area 11 of rollo screen 5 extends through entrance opening 18 making this opening smaller for locking member 24. In the embodiments of FIGS. 8-12, either locking member 24 and/or edge area 11 is made of elastically deformable material. In the FIG. 13 embodiment a wall part 28 of holding groove 17 is made of a separate, elastically deformable, i.e. flexibly bendable piece of material 29 fixed to guide 12, for example clamped in a mounting groove 30 at an edge facing away from holding groove 17.

The embodiment of FIG. 14 is comparable to that of FIG. 9, but includes a holding groove 17 and a locking element 24 having a trapezium-shaped cross section, the short side of which is at the entrance 18.

Figure 15:
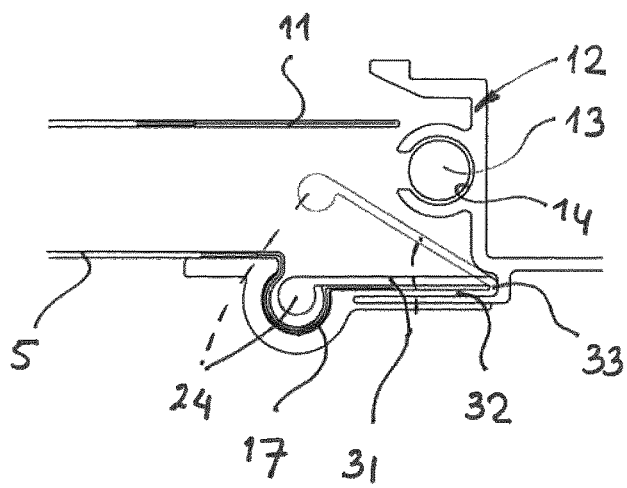

In FIG. 15, locking element 24 is provided with its own accommodating member 31, here in the form of a holding arm extending preferably along the entire length of locking element 24. The accommodating member 31 is connected to a mounting part 32 via a folding line 33 through which the accommodating member and therefore locking element is movable between a holding position, in which locking element is within holding groove 17, and a resting position dictated by the accommodating member 31. The accommodating member 31 may also clamp the outer edge of the edge area 11 onto guide 12 to even better hold edge area 11 of rollo screen 5.

Figure 16:
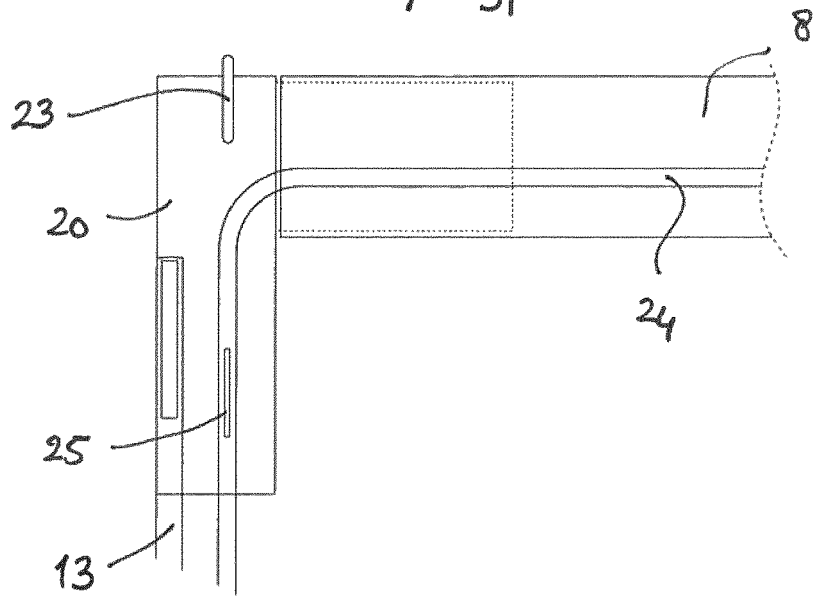
FIGS. 16-18 are simplified plan views the subject of FIG. 5 for three different embodiments.
Figure 17:
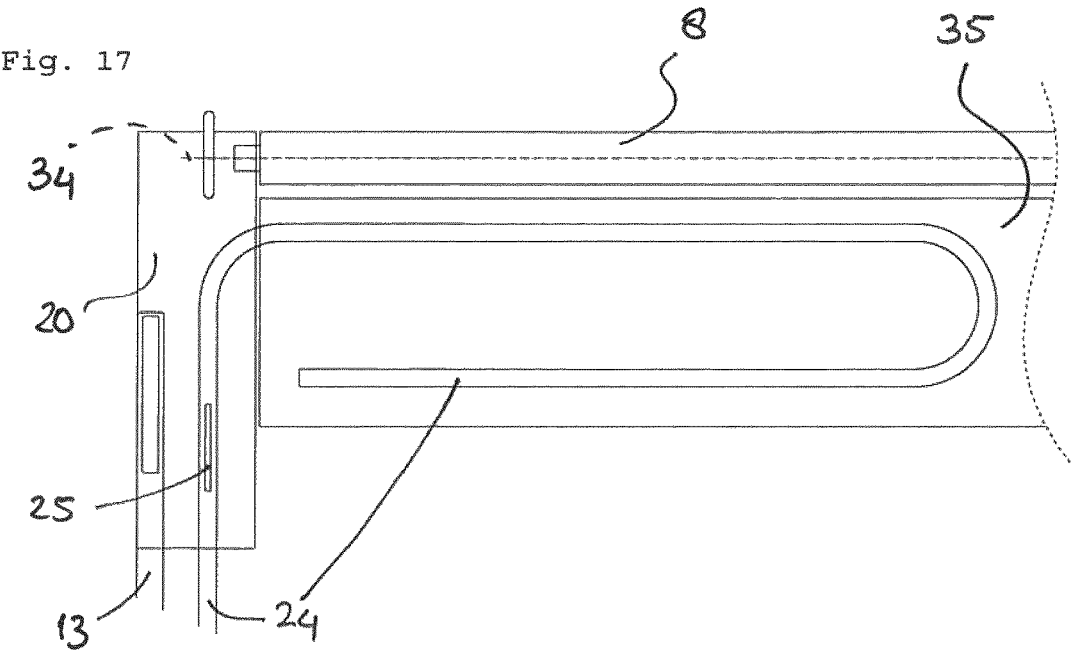

FIG. 16 shows how locking element 24 is guided into reversal member 8 of FIGS. 3-6. FIG. 17 illustrates another embodiment in which reversal member 8 is a roller rotatable around an axis of rotation 34. Behind reversal member 8, there is provided a hollow accommodating beam 35. The hollow beam 35 is large enough to accommodate a length of locking element 24 which is folded into a zig-zag or loop-shape.

Figure 18:
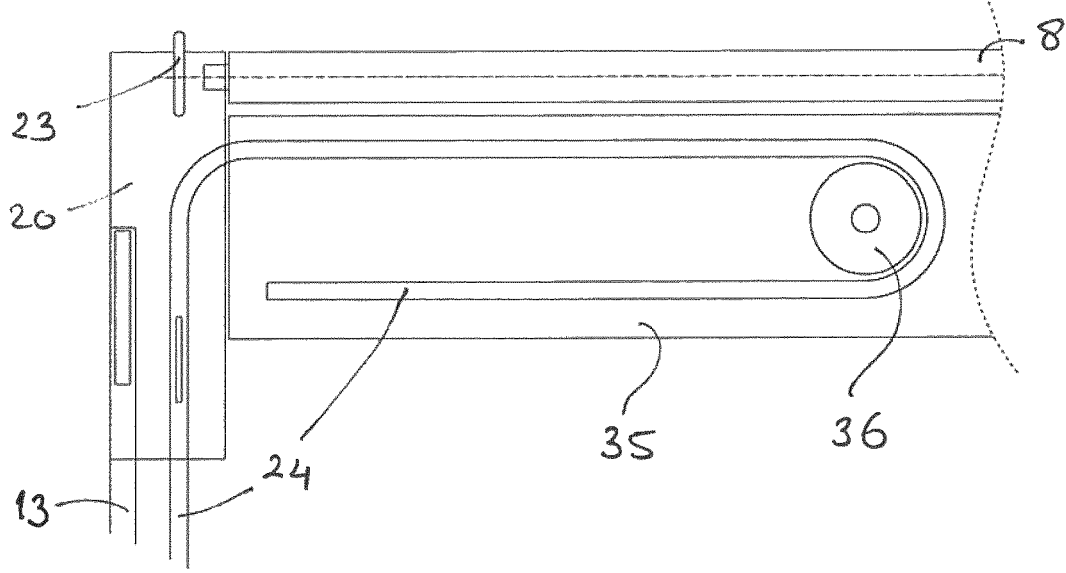

FIG. 18 shows a substantially horizontally rotating pulley 36 around which locking element 24 can be guided into the desired loop shape. More pulleys may be provided if desired.

Figure 19:
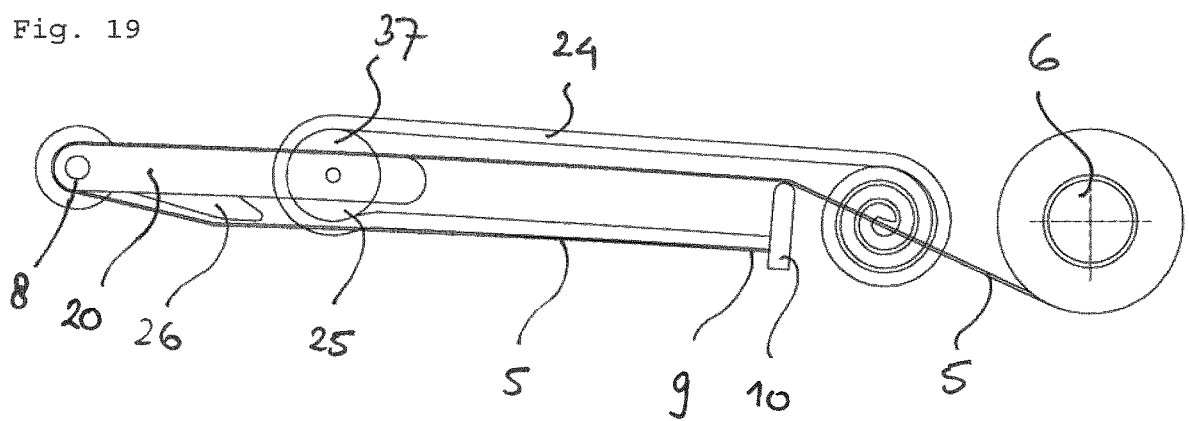
FIGS. 19, 20 are views corresponding to that of FIG. 6, but showing two other embodiments of the sunshade assembly.

FIG. 19 illustrates a further embodiment, in which elongated locking element 24 is windable or self-winding and is guided back along a pulley 37 (which may also act as inserting element 25) towards winding shaft 6 where self-winding locking element 24 is allowed to wind, for example on a winding shaft not shown. Of course, it would also be possible to allow the winding shaft to exert a winding force, so that locking element 24 does not have to be self-winding, but is wound by the force of the winding shaft. The force of the winding shaft could be a spring force, but the winding shaft could also be driven. In principle, locking element 24 could also be wound on the ends of winding shaft 6, although these ends should be able to rotate at a speed different from the part of winding shaft 6 winding the rollo screen 5, or the thickness of both should be equal.

Figure 20:
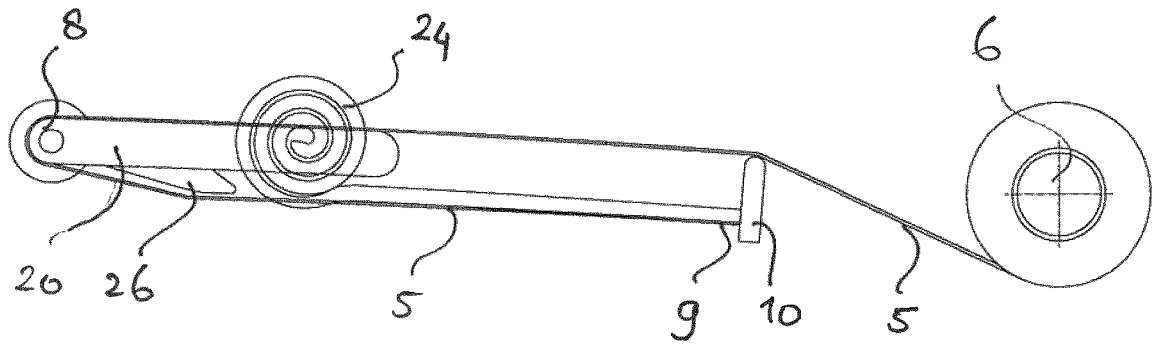

FIG. 20 shows that if space allows, the winding shaft for locking element 24 could also be at the position of pulley 37 of FIG. 19, i.e. at slider 20, so that locking element 24 does not have to be guided back towards winding shaft 6. The winding shaft for locking element 24 could also be oriented differently, e.g. substantially vertically.

Figure 21:
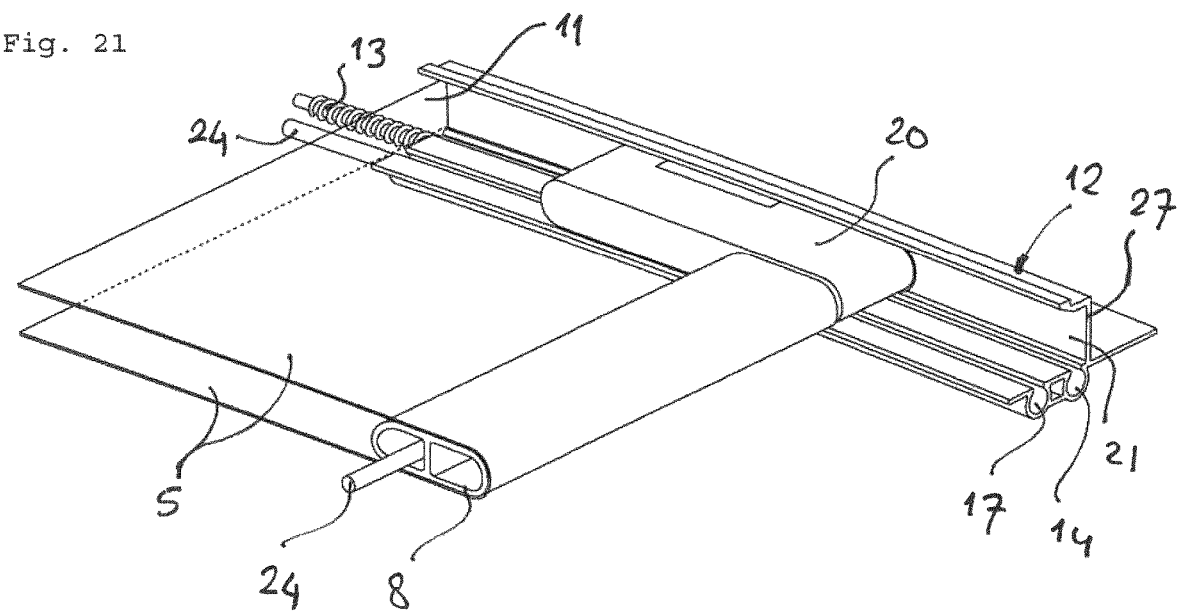
Figure 22:
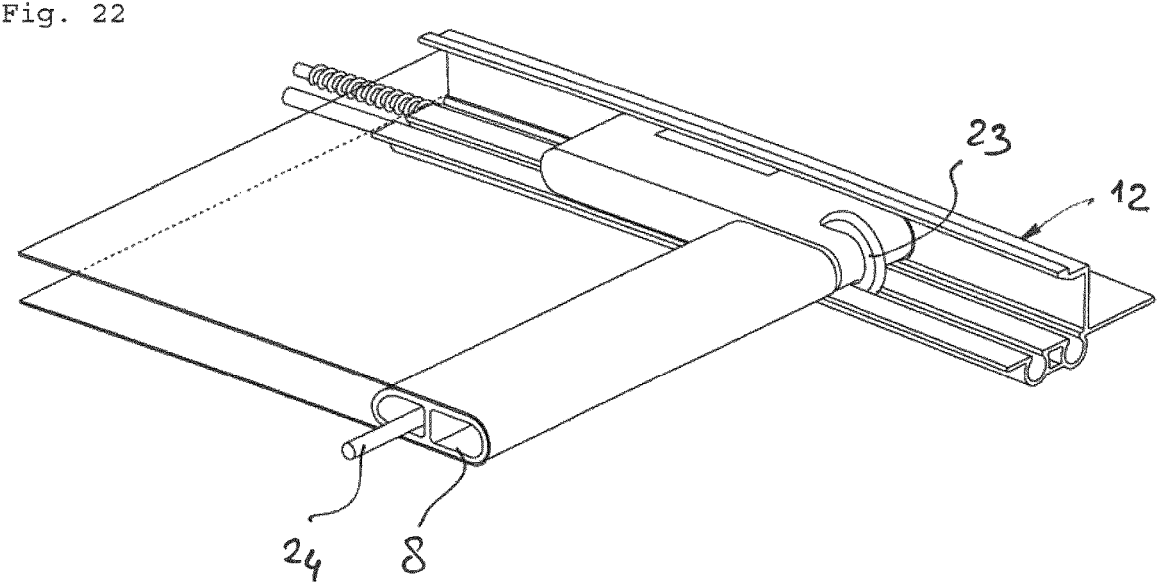

FIGS. 21 and 22 show two different embodiments, wherein FIG. 22 to ensure a tension in rollo screen 5 and to ensure that the edge of rollo screen 5 is not pulled inwardly when edge area 11 is inserted into holding groove 17. In the embodiment of FIG. 22, it is element 23 protruding at least upwardly and forwardly to tension the cloth of rollo screen 5 before it is inserted in holding groove 17 by either element 23 or finger-shaped element 26.

FIGS. 23-27 show different configurations of edge area 11 of rollo screen 5, especially regarding the presence of one or more stop members providing additional safety against the edge area 11 moving past tensioning element 23 and/or slipping out of holding groove 17.

Figure 23:
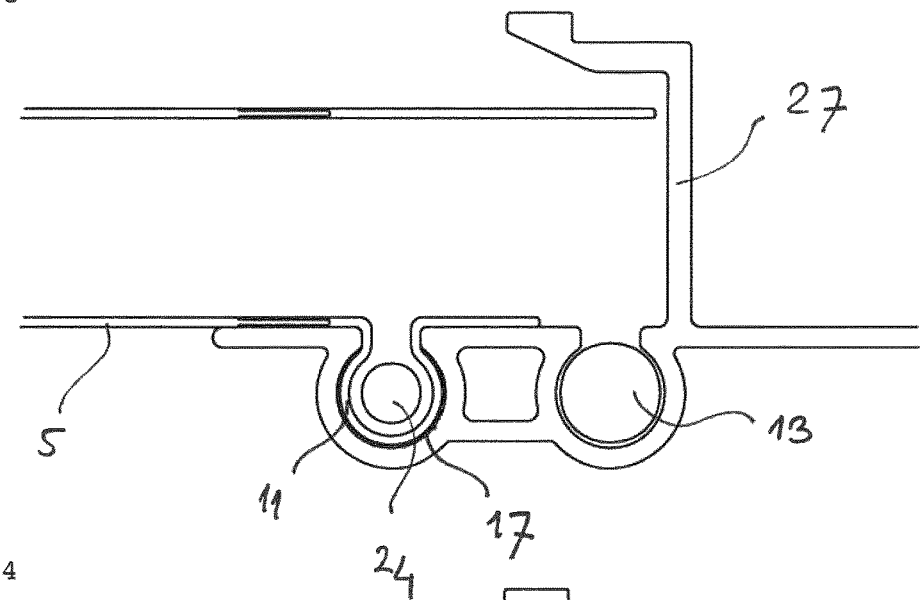
FIGS. 23-27 are views similar to that of FIG. 14 and showing embodiments in which the edge area of the rollo screen are configured differently.

FIG. 23 shows rollo screen 5 as in FIGS. 3-7 in which there is only a position where edge area 11 connects to the remainder of rollo screen 5. Edge area 11 may be different from the remainder of rollo screen 5, for example more or less elastic, more pliable, thinner or thicker, or the like. It may also be made of cheaper material compared to the portion of the rollo screen 5 that is visible that should have an aesthetic nice appearance. The edge area 11 only has functional requirements, so if a certain embodiment of the edge area 11 is chosen, it can be combined with different cloth types for the visible portion of rollo screen 5.

Figure 24:
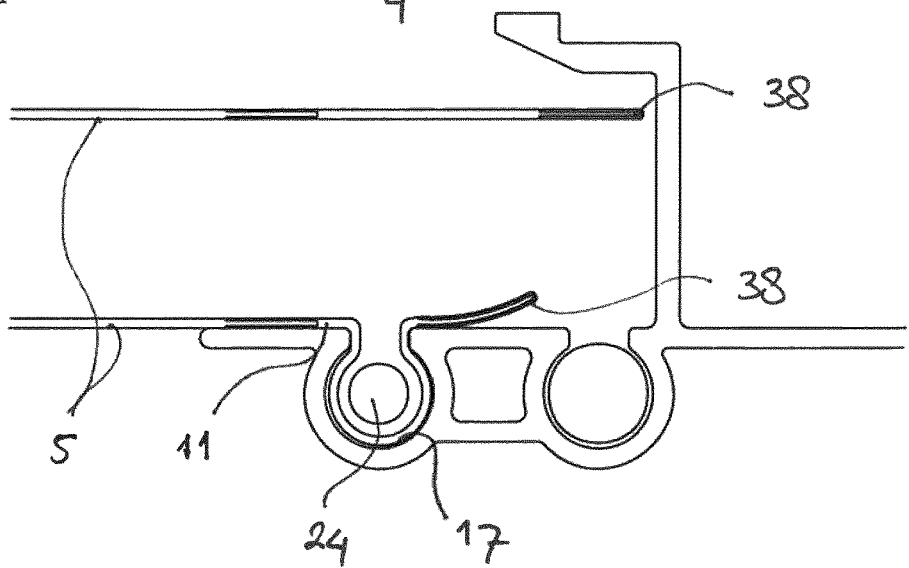

FIG. 24 shows an edge area 11 provided with a so called fabric strip 38 wrapped and heat-welded around the outer edge of edge area 11 acting as stop member.

Figure 25:
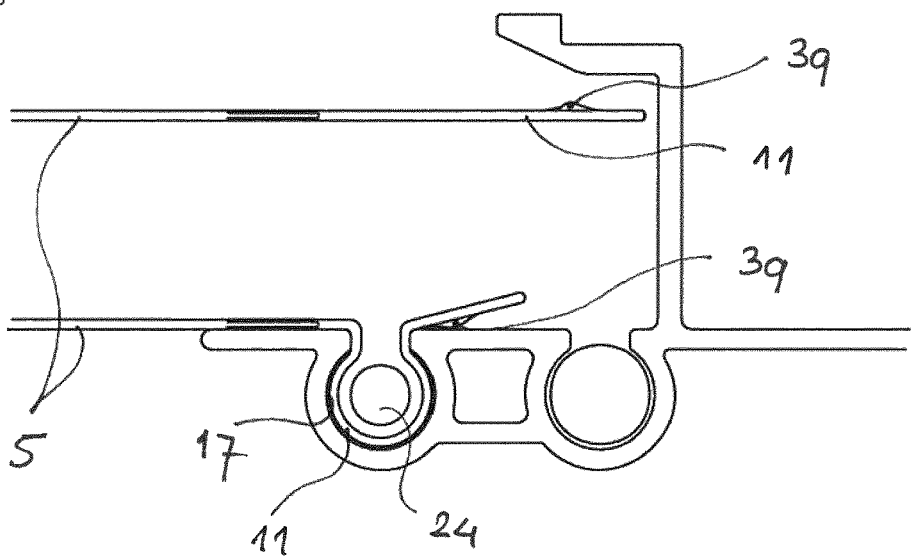

In FIG. 25 there is a steel wire 39 or the like attached, e.g. stitched to the cloth of edge area 11 of rollo screen 5 to act as stop member.

Figure 26:
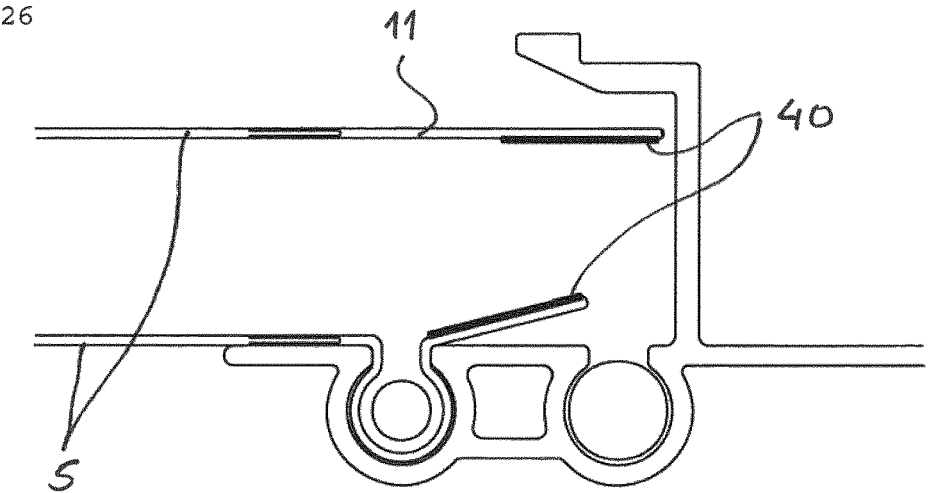

In the embodiment of FIG. 26, there is a stop member in the form of a strip 40 attached to one side of the outer edge of edge area 11. This strip 40 can be made of many types of material, like steel, or plastic and can be heat-welded, glued or stitched to it, for example.

Figure 27A:
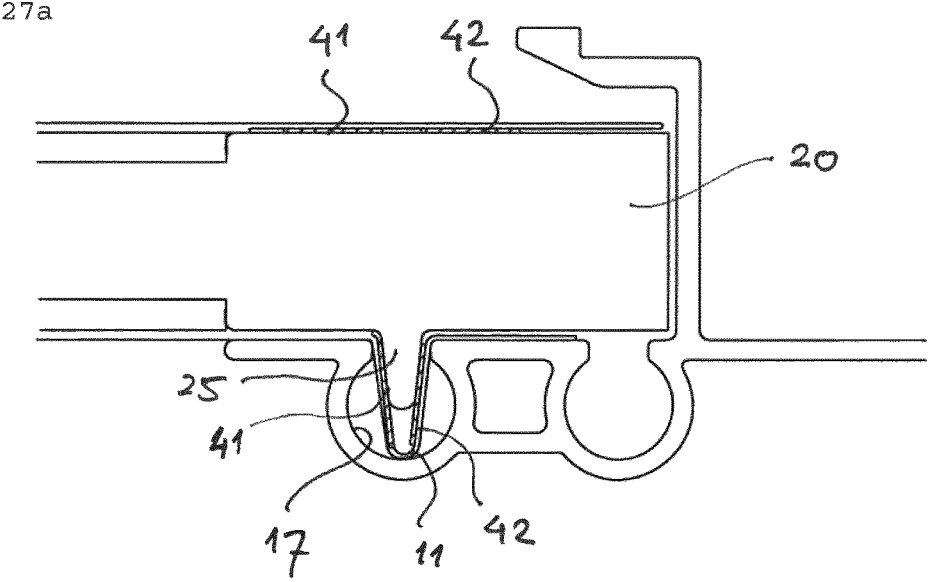
Figure 27B:
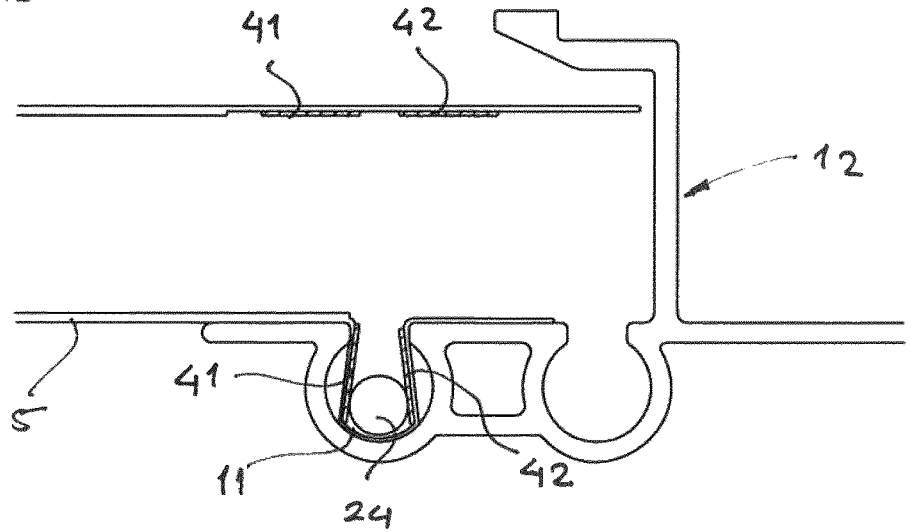

To further improve the locking function of edge area 11 of rollo screen 5, it can be provided with 2 additional strips 41, 42 acting as stop members and as shown in FIG. 27a, 27b. They are positioned inward of the outer edge at the location where the edge area should be inserted into holding groove 17. The strips are spaced apart such that edge area 11 can bend between strips 41, 42 as is shown in FIG. 27a and can take up locking element 24 between them as is shown in FIG. 27a. The edge area 11 of rollo screen is now even more reliably locked in holding groove 17.

Figure 28:
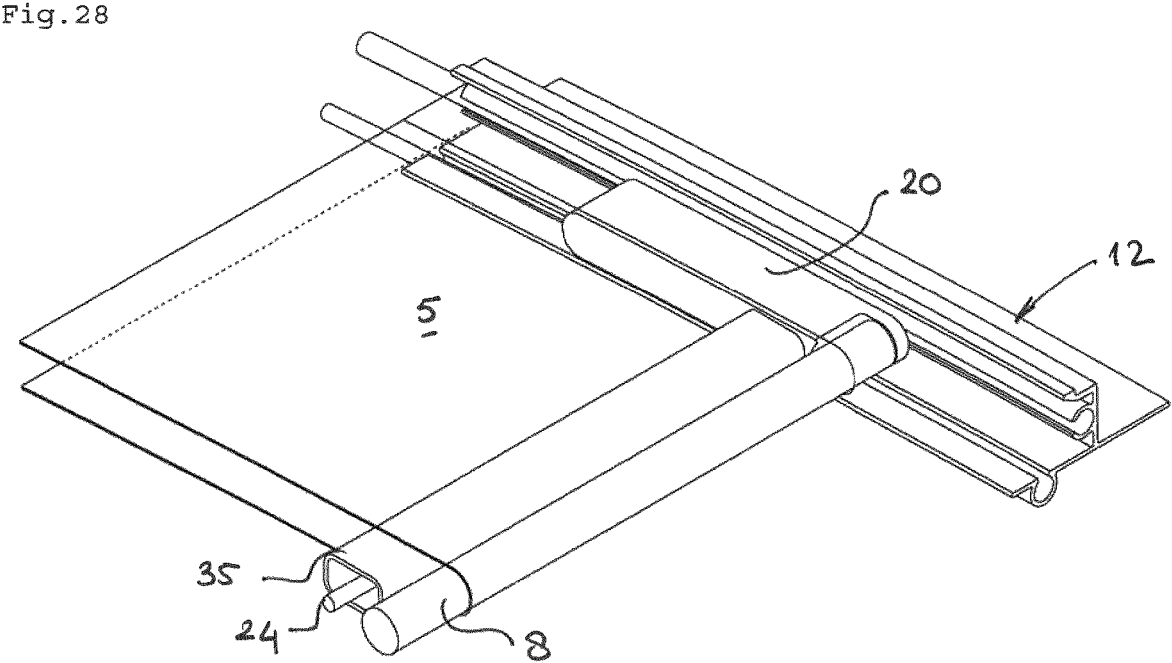
FIGS. 28, 29 are views similar to that of FIG. 22, but showing different embodiments of the reversal member.
Figure 29:
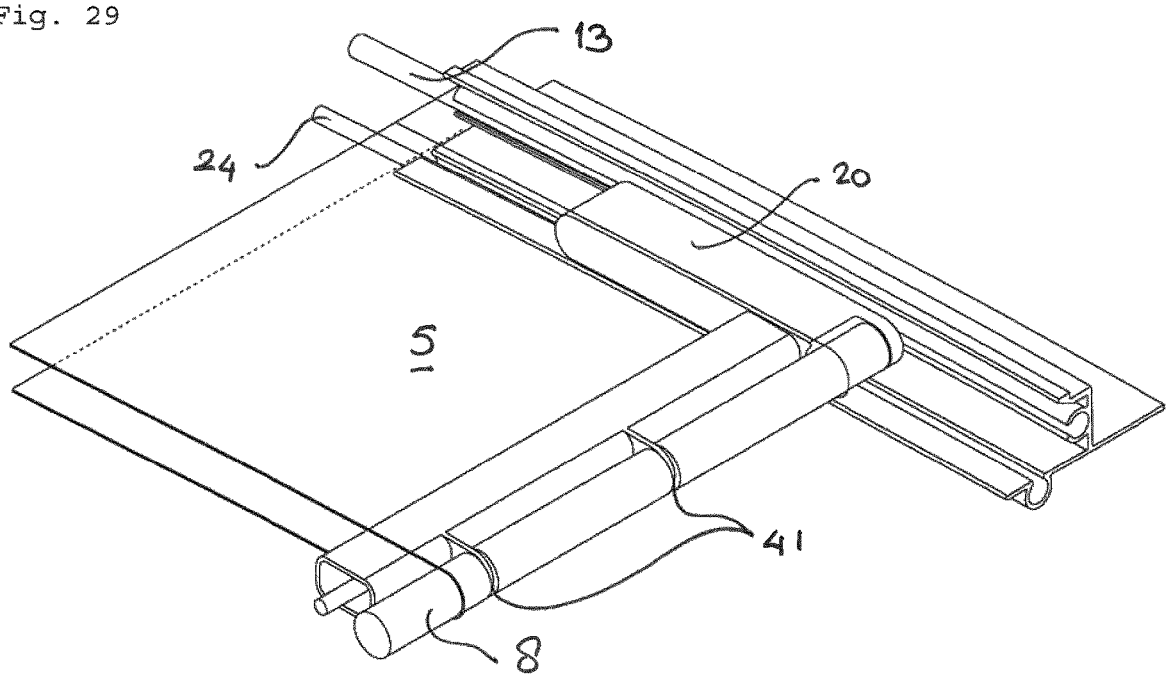

FIGS. 28 and 29 show embodiments of the sunshade assembly in which the operating beam is provided with a roller as reversal member 8, like in the embodiments of FIGS. 17, 18. In FIG. 28, there is provided a single roller rotatably supported at both ends, while in the FIG. 21 embodiment the roller has several supports 41 distributed along its length to prevent the roller of reversal member 8 from becoming flexed.

Figure 6:
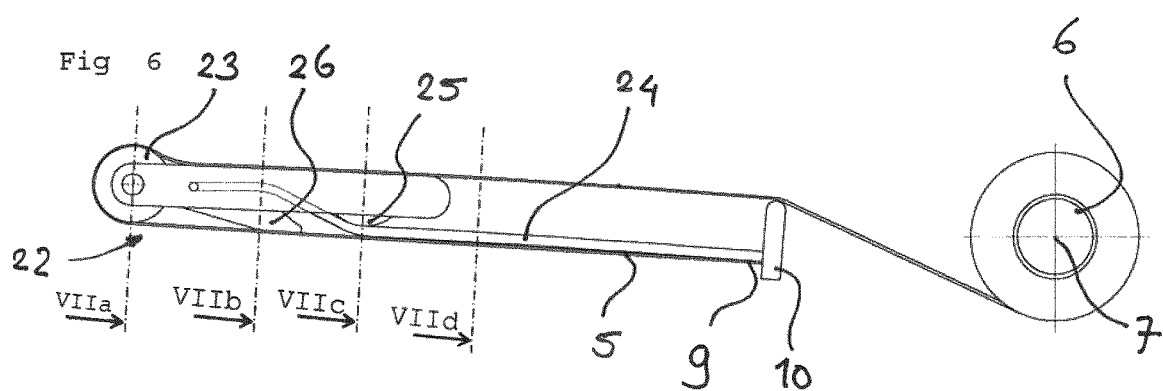
FIG. 6 is an enlarged cross-sectional view along the line VI-VI in FIG. 2b.
Figure 30:
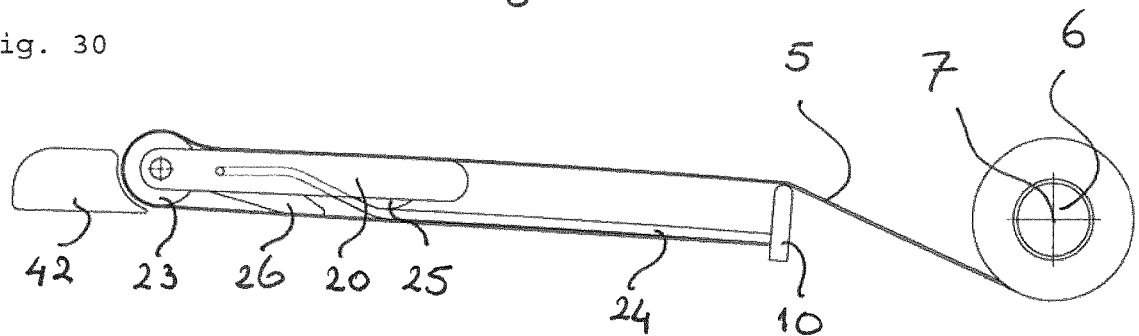
FIG. 30 is a view corresponding to that of FIG. 6, with an added rollo screen displacer.

The embodiment of FIG. 30 is similar to that of FIG. 6, except for an added removing member 42 of the rollo screen displacer 22, ensuring that edge area 11 of rollo screen 5 is removed from holding groove 17 when element 23 moves along rollo screen 5 to wind it on winding shaft 6 via reversal member 8. It may replace or complement cover member 16.

The invention is not limited to the embodiments described before, which may be varied widely within the scope of the invention as defined by the appending claims. For example, it would be possible to provide a rollo assembly without a reversal member. The winding shaft is then arranged at the position of the reversal member, so that the winding shaft moves when the rollo screen is wound or unwound. The locking element could also be non-stationary and move with reversal member 8. In this case, the excess length of the locking element created when opening, i.e. winding the rollo screen comes out of the holding groove at a position near the winding shaft.

The invention claimed is:

1. An open roof construction for a vehicle, comprising a roof opening in a stationary roof part and a rollo assembly positioned below said roof opening intended for covering the roof opening, wherein the rollo assembly comprises a rollo screen and a winding shaft for the rollo screen which is rotatable around a stationary axis of rotation, and wherein the rollo screen, starting from the winding shaft, firstly extends in a first direction, next around a reversal member and finally back in an opposite second direction and ends at a rollo screen edge which is attached to a stationary member of the open roof construction, wherein the reversal member is movable in parallel to said first and second directions in correspondence with an amount of rollo screen being wound on or off said winding shaft, the rollo screen having two longitudinal edges which, when the rollo screen is wound off, are brought into engagement with holding members extending alongside the longitudinal edges of the roof opening, and wherein the holding members each comprise a least a holding groove having an elongated entrance opening, an edge area near each of the longitudinal edges of the rollo screen being insertable into the holding groove together with a locking member clamping the rollo screen in the holding groove, the locking member, the edge area of the rollo screen and the holding groove having a shape and/or dimension preventing the locking member from leaving the holding groove through the entrance opening.

2. The open roof construction according to claim 1, wherein the entrance opening of the holding groove is more narrow than the holding groove, such that the locking member is locked within the holding groove when the locking member and the edge area of the rollo screen are inserted in the holding groove through the entrance opening.

3. The open roof construction according to claim 2, wherein an opposite edge opposite the rollo screen edge is formed by an operating beam which comprises the reversal member which is movable parallel to the roof opening in first and second directions in correspondence with an amount of rollo screen being wound on or off said winding shaft, and wherein the operating beam is provided with a displacer configured to act on at least one of the locking member or the holding groove to enable the locking member to enter and exit the holding groove together with the edge area of the rollo screen.

4. The open roof construction according to claim 3, wherein at least one of the edge area of the rollo screen, the locking member or the holding groove is resiliently deformable to enable the locking member to enter and exit the holding groove.

5. The open roof construction according to claim 2, wherein each longitudinal edge area extends into the holding groove through the entrance opening, around the locking member and then out of the holding groove again.

6. The open roof construction according to claim 1, wherein an opposite edge opposite the rollo screen edge is formed by an operating beam which comprises the reversal member which is movable parallel to the roof opening in first and second directions in correspondence with an amount of rollo screen being wound on or off said winding shaft, and wherein the locking member is stationary in longitudinal direction with respect to the holding groove, and wherein the stationary roof part is provided with an accommodating groove parallel to the holding groove to accommodate the locking member when it exits the holding groove in case the operating beam is moved to wind the rollo screen on the winding shaft.

7. The open roof construction according to claim 1, wherein an opposite edge opposite the rollo screen edge is formed by an operating beam which comprises the reversal member which is movable parallel to the roof opening in first and second directions in correspondence with an amount of rollo screen being wound on or off said winding shaft, and wherein the locking member is stationary in longitudinal direction with respect to the holding groove, and wherein either the operating beam or the stationary roof part is provided with a winding pulley to accommodate the locking member when it exits the holding groove in case the operating beam is moved to wind the rollo screen on the winding shaft.

8. The open roof construction according to claim 1, wherein an opposite edge opposite the rollo screen edge is formed by an operating beam which comprises the reversal member which is movable parallel to the roof opening in first and second directions in correspondence with an amount of rollo screen being wound on or off said winding shaft, and wherein the locking member is stationary in longitudinal direction with respect to the holding groove, but is movably attached to the stationary roof part next to the respective holding groove so as to be movable between a position within the holding groove and a position next to the holding groove, the operating beam or a part moving with the operating beam being provided with a displacer configured to act on the locking member to move the locking member between both positions when the operating beam is moved to wind or unwind the rollo screen.

9. The open roof construction according to claim 1, wherein the entrance opening of the holding groove is on an upper or lateral side thereof.

10. The open roof construction according to claim 1, wherein the holding groove is at least partly defined by a flexible free standing groove wall which is configured to bend when the locking member is entering or exiting the holding groove.

11. A rollo assembly for use in an open roof construction having a roof opening in a stationary roof part, and holding members extending alongside longitudinal edges of the roof opening, wherein the holding members each comprise a least a holding groove having an elongated entrance opening, the rollo assembly configured to close the roof opening and comprising, a rollo screen and a winding shaft for the rollo screen which is rotatable around a stationary axis of rotation, and wherein the rollo screen, starting from the winding shaft, firstly extends in a first direction, next around a reversal member and finally back in an opposite second direction and ends at a rollo screen edge configured to attach to a stationary member of the open roof construction, wherein the reversal member is movable in parallel to said first and second directions in correspondence with an amount of rollo screen being wound on or off said winding shaft, the rollo screen having a width between two longitudinal edges which, when the rollo screen is wound off, are brought into engagement with the holding members such that an edge area near each of the longitudinal edges of the rollo screen are insertable into the holding groove together with a locking member clamping the rollo screen in the holding groove, the locking member having a shape and/or dimension preventing the locking member from leaving the holding groove through the entrance opening.

12. The rollo assembly according to claim 11, wherein a stop member is provided at or near the longitudinal edges of the rollo screen and is configured to cooperate with the locking member to ensure the rollo screen remains locked in the holding groove.

13. The rollo assembly according to claim 11, wherein the locking member is stationary in longitudinal direction with respect to the holding groove, wherein an opposite edge opposite the rollo screen edge is formed by an operating beam which comprises the reversal member which is movable parallel to the roof opening in first and second directions in correspondence with an amount of rollo screen being wound on or off said winding shaft, and wherein the operating beam is configured to accommodate the locking member when it exits the holding groove in case the operating beam is moved to wind the rollo screen on the winding shaft.

14. The rollo assembly according to claim 13, wherein the locking member is accommodated in a loop-shaped fashion in the operating beam.

15. The open roof construction according to claim 13, wherein the locking member is accommodated in a loop-shaped fashion in the operating beam along one or more pulleys.

16. The rollo assembly according to claim 11, wherein an opposite edge opposite the rollo screen edge is formed by an operating beam which comprises the reversal which is movable parallel to the roof opening in first and second directions in correspondence with an amount of rollo screen being wound on or off said winding shaft, and wherein the operating beam is provided with a member to hold the respective longitudinal edge of the rollo screen when the edge area is pushed into the holding groove.

17. The rollo assembly according to claim 11, wherein the locking member is of circular or trapezium-shaped cross section.

18. The rollo assembly according to claim 11, wherein the longitudinal edges of the rollo screen are each provided with a stop member configured to keep the respective longitudinal edge of the rollo screen substantially stationary in lateral direction when the edge area is pushed into the holding groove.

19. The rollo assembly according to claim 18, wherein the stop member is at least one of a strip, cable and/or edge reinforcement.

20. The rollo assembly according to claim 19, wherein the stop member is positioned substantially within the edge area of the rollo screen and includes two spaced strips such that in a closed position of the rollo screen they are positioned in the holding groove with the locking member between them.

21. The rollo assembly according to claim 11, wherein the locking member is an elongated element which may be constructed as a solid steel or a twisted steel cable or wire, or a rod made of rubber-like material or plastic, such as nylon or PMMA.

\* \* \* \* \*